G. M. Phelps,
Printing Telegraph.
N°26,003.
Patented Nov. 1, 1859.
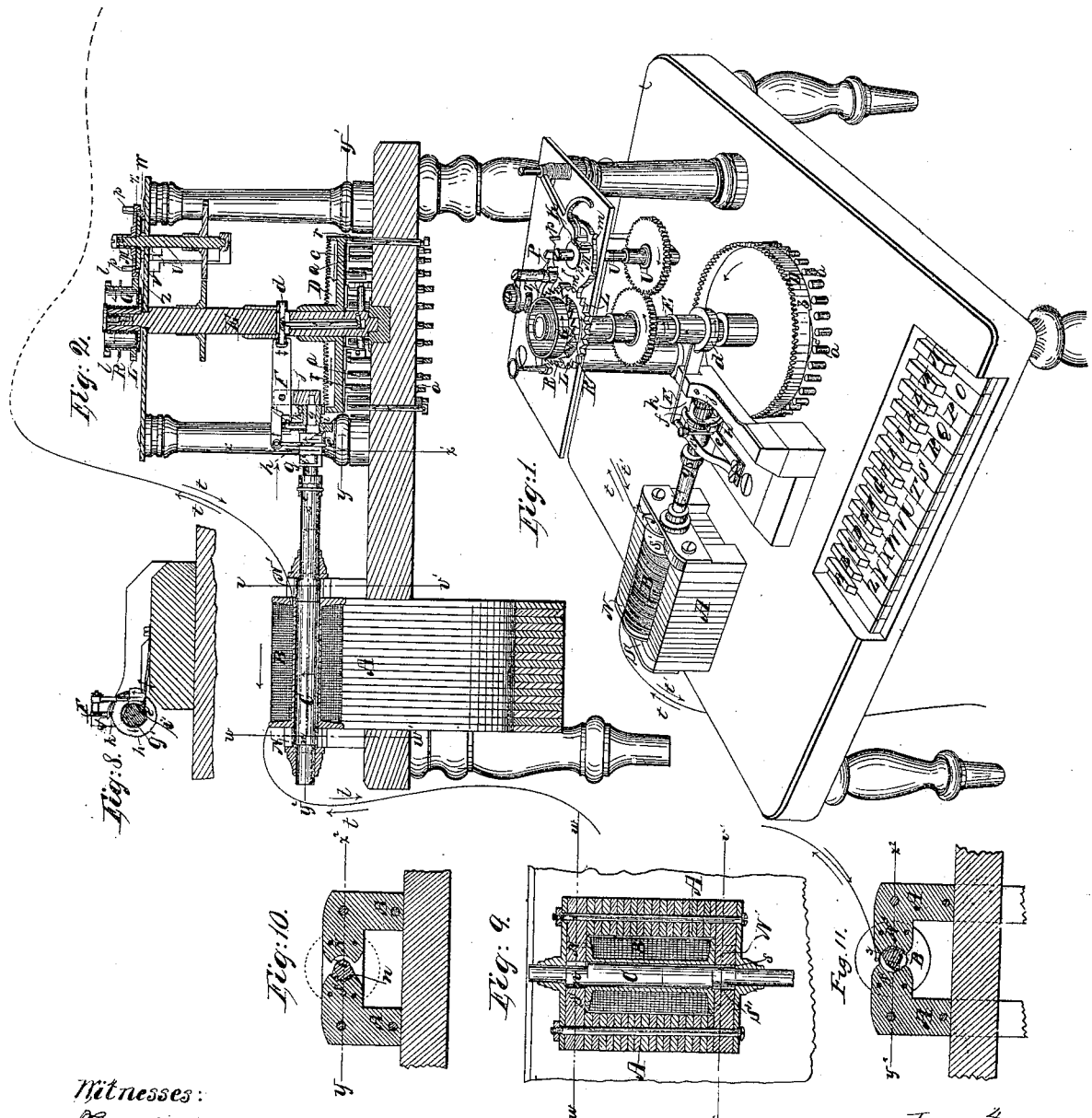
Witnesses:
Thos. P. Cornelius
Austin F. Park
Inventor:
George M. Phelps G. M. Phelps,
Printing Telegraph.
N° 26,003.
2 Sheets, Sheet 2.
Patented Nov. 1, 1859.
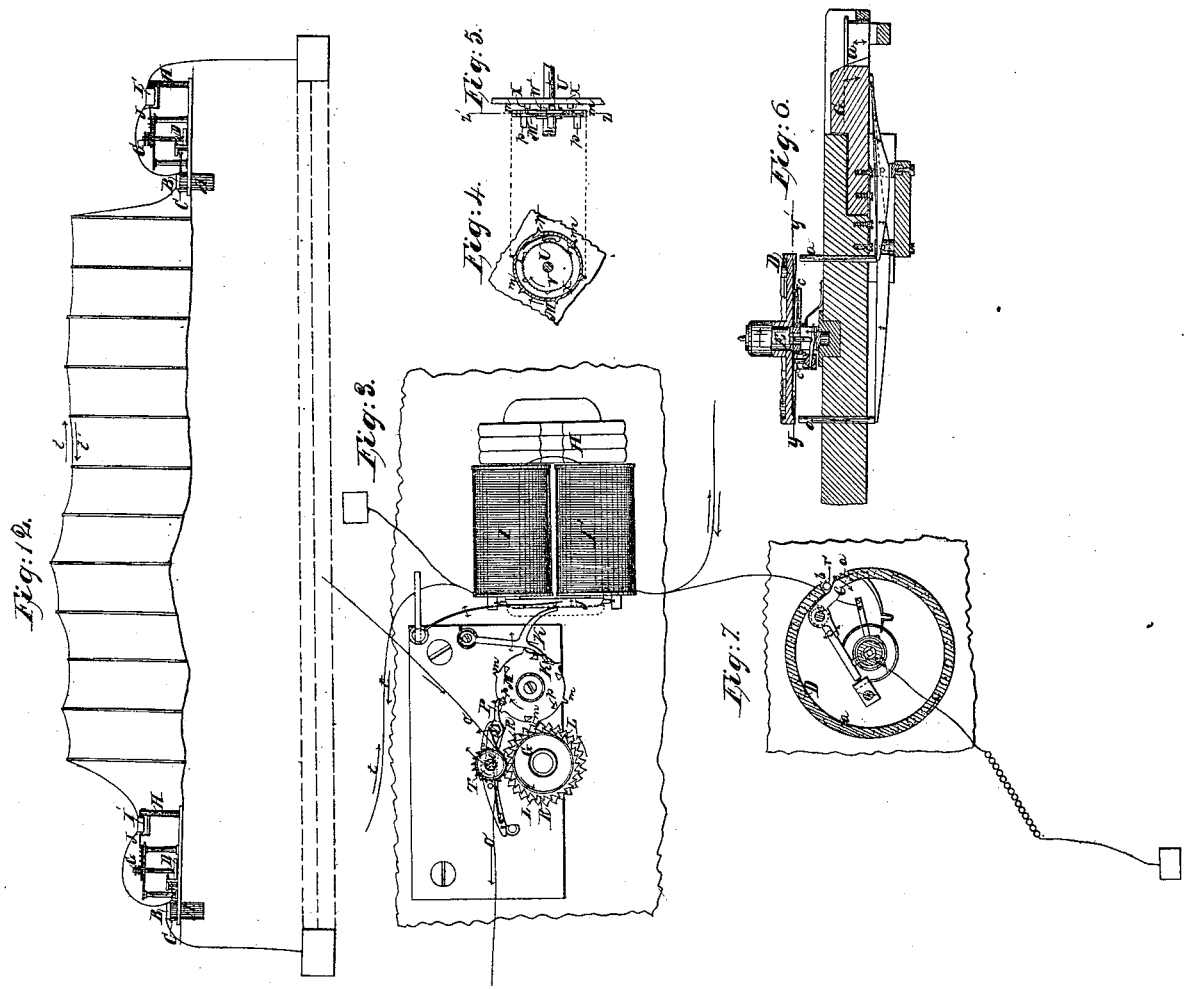
Witnesses:
Thos. J. Cornelius
Austin F. Park
Inventor:
George M. Phelps

UNITED STATES PATENT OFFICE.

GEO. M. PHELPS, OF TROY, NEW YORK, ASSIGNOR TO THE AMERICAN TELEGRAPH COMPANY.

IMPROVEMENT IN TELEGRAPHIC MACHINES.

Specification forming part of Letters Patent No. 26,003, dated November 1, 1859.

*To all whom it may concern:*

Be it known that I, GEORGE M. PHELPS, of the city of Troy, in the county of Rensselaer and State of New York, have invented certain new and useful Improvements in Hughes' Electro-Magnetic Printing-Telegraph, (patented in the United States May 20, 1856;) and I do hereby declare that the following is a full, clear, and exact description of my invention, reference being had to the annexed drawings, making a part of this specification, in which—

Figure 1 is a perspective view of the parts; Fig. 2, a sectional elevation; Fig. 3, a plan of the printing mechanism; Fig. 4, a section at and plan of the parts just under the line $z\ z'$; Fig. 5, a sectional elevation of the part shown in section in Fig. 4, turned to a vertical position; Fig. 6, a vertical section of the key-board; Fig. 7, a section at and plan of parts just below the line $y\ y'$; Fig. 8, a section at and elevation of some parts on the right-hand side of the line $x\ x'$; Fig. 9, a section of the magneto-electric battery at the line $y^2\ x^2$, and Fig. 10 a section of the same at the line $w\ w'$, and Fig. 11 another at the line $v\ v'$. Fig. 12 indicates the electric circuit for two telegraphic localities.

The same letters refer to like parts in all the figures, and the arrows upon or by the parts respectively indicate the directions in which the parts move.

One part of my invention relates to the mode of producing from a magneto-electric battery the momentary currents of electricity that are employed to actuate the printing mechanism of the instruments in transmitting intelligence.

A is the permanent magnet; B, the helical coil of insulated wire; and C, the intermittingly-rotary armature of the magneto-electric battery from which the pulsations, waves, or momentary currents are derived. N N' indicate the two north, and S S' the two south, poles of the magnet A; and $n$ and $s$ are the parts of the armature C which are applied to the poles of the magnet.

The armature is represented at rest and in the same position in all the figures.

During each time the armature C is turning once around on its axis its polarity is reversed twice, and consequently there is, during the same time, an electric current induced in the surrounding coil B and through the helical coils I I' of the printing mechanism and the entire constantly-closed telegraphic circuit, first in one direction and then in the opposite one, as indicated by the arrows $t\ t'$. While the armature C is turning through the first half of its revolution it induces a current which lessens the attractive power of the magnet H for its armature J, so as to allow the latter to spring away from the magnet against a detent, K, and thereby put in action the part that applies the paper $o$ to the type-wheel G. While the armature C is turning through the latter half of its revolution it induces a current, which increases the attraction of the magnet H for the armature J beyond what it is when no current is passing through the coils I I'; and I prefer to so gear the part M (which carries the armature J back to the magnet) in respect to the motion of the armature C that the armature J shall reach the magnet H just when the attraction of that magnet is thus increased, in order that the armature J shall be more surely retained by the magnet when put back thereto.

The armature C is so connected with the key-board that the former is turned just once around every time any one of the finger-keys is properly depressed. By pressing down any one of the finger-keys, as G in Fig. 7, a pin, $a$, is slid up against the constantly-revolving wheel D, as shown at $r$ in Fig. 2, and by continuing the pressure upon the key until the notch $b$ in the wheel D comes over the elevated pin, the pin is then raised into the notch, as indicated at $r'$ in Figs. 2 and 7, so that the said pin is then struck by and turns inward an arm, $c$, of a lever that is pivoted at $c'$ to the wheel D, which lever is thus made to slide a collar, $d$, upward on the shaft E by means of suitable intermediate parts, as is illustrated by the drawings. As the revolving collar $d$ rises it moves a lever, F, so as to press down a stop or detent, $e$, and leave the armature C free to be turned and at the same time move a guide, $k$, so as to let a spring-catch, $f$, which is fast on the shaft $g$ of the armature C, engage with the teeth of a ratchet-wheel, $h$, which is fast on a hollow shaft, $i$, which runs on the shaft $g$, and is secured to a pinion, $j$, which is constantly revolved by the wheel D. As soon as the catch $f$ strikes into the teeth of the ratchet $h$ the armature C turns with the same speed as that wheel; but before the armature completes a revolution the arm c leaves the elevated pin that forced it inward, and hence allows the detent e to spring into the notch $i'$, (see Fig. 8,) and also move the lever, so that the part k shall remove the catch f from the ratchet, and thus stop the armature just at the end of one revolution.

The spring-catch $i^2$ is to prevent the armature from rebounding when suddenly arrested.

The constantly-revolving wheel D makes one revolution in the same time that the type-wheel G makes one, and there is a pin, a, for each finger-key, and a key for each type and blank space on the type-wheel, and the pins a are arranged at equal distances apart, the same as the type l, which are seen only in Fig. 2.

It is obvious that many modifications may be made in the above-described mechanism without materially affecting the result. Thus, other forms of magneto-electric battery may be employed. The construction and operation of the contrivance that moves in harmony with the type-wheel and controls the action of the depressed finger-keys upon the current-inducing part of the battery may be varied, and various devices may be employed to connect the finger-keys with the current-inducing part of the battery and make the latter move a certain fixed distance each time a key is depressed, without affecting the distinguishing characteristic of this part of my invention, for the nature of it consists in producing from a magneto-electric battery the momentary currents of electricity for actuating the printing mechanism in transmitting intelligence by moving the armature or other current-inducing part of the battery intermittingly by the use of a set of finger-keys, which, when depressed, are controlled in their action upon the current-inducing part of the battery by a mechanical contrivance which revolves in harmony with the constantly-revolving type-wheel.

Another part of my invention consists in increasing the capability of the instruments for transmitting words and sentences by running the transmitting mechanism and type-wheel so much faster than the devices which return the armature J to its magnet and apply the paper to the type can operate that adjoining letters on the type-wheel cannot be printed in immediate succession. Thus, for example, the type-wheel G turns as fast as the intermittingly-moving wheel M, which returns the armature J to the magnet, and (by six pins, p, acting on a lever, P, which carries the platen O) applies the paper o to the type just six times during one revolution of itself. Consequently no more than six of the type can be printed from during one revolution of the type-wheel. To illustrate the great importance of this part of my invention, I will suppose that the twenty-six letters, a period, and a blank space are arranged around the type-wheel in alphabetical order, as usual, and that the phrase "David E. Hughes' Electro-Magnetic Printing-Telegraph" is to be printed. If the transmitting mechanism and type-wheel are run so slow that every type can be printed from during one revolution, it will need twenty-seven revolutions of the type-wheel to print that phrase, and I will suppose that those twenty-seven turns require twenty-seven seconds of time; but if the type-wheel and transmitting device run twice as fast, so that no nearer than alternate type can be printed from, then only thirty revolutions of the type-wheel will be required, which will occupy but fifteen seconds; and if the last-named speed of the type-wheel is doubled, so that only seven types can be printed from during one revolution, then only thirty-two turns will be required, which will need but eight seconds.

I now generally construct the instruments for land-lines of not over five hundred miles in length with the transmitting mechanism and type-wheel so geared in respect to the parts which apply the paper that no more than five letters can be printed at one revolution of the type-wheel, and then run the type-wheel from one hundred to one hundred thirty turns per minute.

The type-wheel G is driven by a frictional connection between it and the driving-shaft E. A ring of teeth, L, equal in number to the letters, character, and blank, is fastened around the type-wheel, the teeth being arranged at equal distances apart, the same as the type. Each time the armature J springs back from the magnet it moves a detent, K, so as to thereby set free an intermittingly-moving corrector, M, a tooth, m, of which, in the movement of the corrector, so passes between or engages with the teeth of the ring L as to turn the type-wheel a little backward, if the latter is running faster, or forward if running slower, than the transmitting mechanism of the sending-instrument, so as to generally keep the type-wheel from getting so far behind or in advance of the transmitting mechanism as to present a wrong letter to the platen, and so that a type shall be correctly opposite to the platen O when the latter (controlled in its action by the retreat of the armature J) applies the paper to the type-wheel. In Fig. 1 the corrector M is seen at rest and disengaged from the teeth L; but in Fig. 3 the corrector is shown in motion and engaged with those teeth.

The corrector M is so constructed, arranged, and geared with the prime mover which drives the type-wheel by a friction-connection that while the corrector is in motion the tooth or teeth m of the corrector move with substantially the same speed as the teeth L of the friction-driven type-wheel, and a tooth of the corrector remains so engaged with the teeth L as to positively move or turn the type-wheel with the proper speed during the time the platen O is applying the paper to the type, the platen being actuated by or simultaneously with the corrector, substantially as shown by Figs. 1 and 3.

Another part of my invention consists in the following manner of making the cylindrical platen turn on its axis while applying the paper to the type with the same surface speed as the type, so as to get clear impressions and at the same time feed the paper along to receive the letters properly. This I do by means of two rings of teeth, R and T, of suitable construction, and arranged respectively upon the type-wheel G and platen O, so that the said rings of teeth shall engage with each other and turn the platen with the proper movement while the platen is applying the paper to the type, and be disengaged, so as to leave the platen still while the latter is not applying the paper. (See Fig. 3.)

Another part of my invention consists in the following mode, in which I cause a constantly-revolving wheel or shaft, U or $i$, to turn the corrector M, armature C, or other wheel or shaft a certain fixed distance with the same speed as itself at any time, and any desired number of times, by simply moving a detent, K or $e$— that is, by the use of a ratchet-wheel, V or $h$, fast on the driving wheel or shaft, a springing or movable pawl or catch, W or $f$, fast on the corrector M, armature C, or wheel or shaft to be driven, and a fixed or movable guide or guides, X or $k$, the whole being so arranged together, as illustrated by the annexed drawings, that whenever the corrector M or other driven wheel or shaft is at rest, and the detent K or $e$ is so moved as to leave the wheel or shaft that is to be driven free to be turned, the catch W or $f$ is thereupon instantly engaged with the running ratchet-wheel V or $h$, and that whenever the detent stops the motion of the driven wheel or shaft M or C the catch or pawl is just then disengaged from the ratchet by the guide X or $k$, and is kept so thereby until the detent is again moved, so as to leave the corrector or other wheel or shaft free to be turned.

Having thus set forth the construction and operation of my improvements, what I claim as my improvements on such electro-magnetic printing-telegraphs as print from a constantly-revolving type-wheel, and desire to secure by Letters Patent, is—

1. Producing from a magneto-electric battery the momentary electric currents required for actuating the printing mechanism by giving momentary motion to the armature or other current-inducing part of the magneto-electric battery by means of a set of finger-keys, which, when depressed, are controlled in their action upon the current-inducing part of the magneto-electric battery by a mechanical contrivance, which constantly moves in harmony with the intermittingly-revolving type-wheel, substantially as herein described.

2. Increasing the capability of the instruments for telegraphing by so increasing the speed of the transmitting device and type-wheel in relation to the motion of the parts which perform the printing that two or more types shall pass the platen while the printing mechanism is acting once, as herein described.

3. Turning the cylindrical platen while each impression is being made by means of rings of teeth R and T upon the type-wheel and platen, as and for the purpose herein set forth.

4. Making a revolving wheel or shaft, U or $i$, turn the corrector M, armature C, or another wheel or shaft a certain fixed distance with the same speed as itself at any time, and any desired number of times, by the use of a ratchet-wheel, V or $h$, catch W or $f$, guide X or $k$, and detent K or $e$, all arranged together and with the said driving and driven wheel or shaft for conjoint operation, as herein set forth.

GEORGE M. PHELPS.

Witnesses:
 THOS. J. CORNELIUS,
 AUSTIN F. PARK.